Aug. 31, 1943.　　　W. F. SANTHOFF　　　2,328,298
DETACHABLE COUPLING FOR HIGH PRESSURE HOSE
Filed Sept. 10, 1941
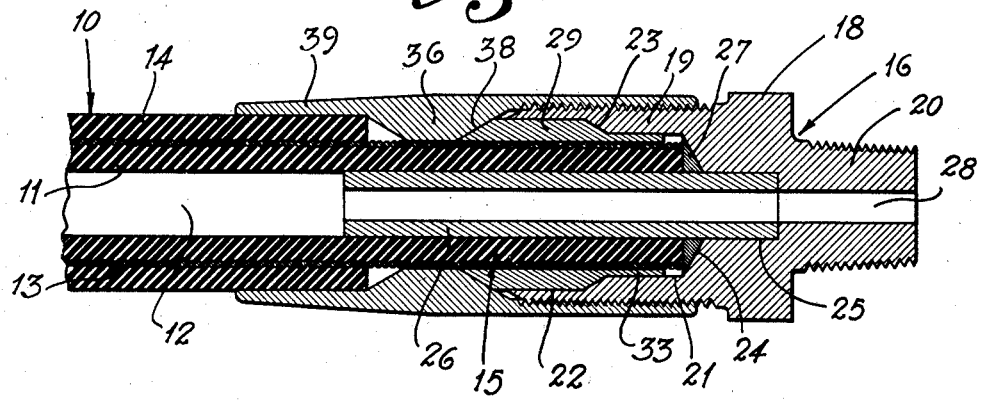
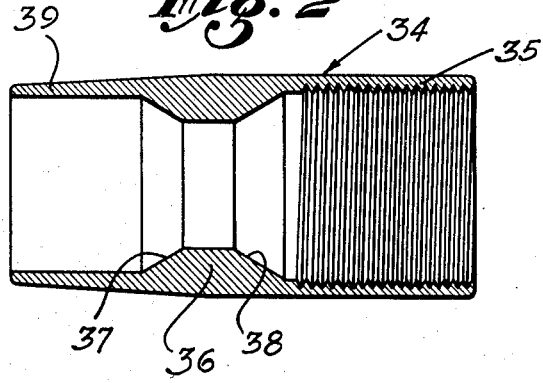
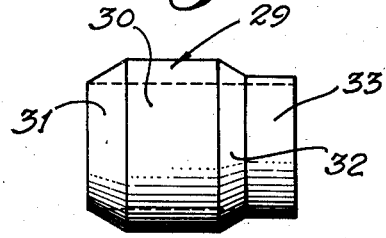
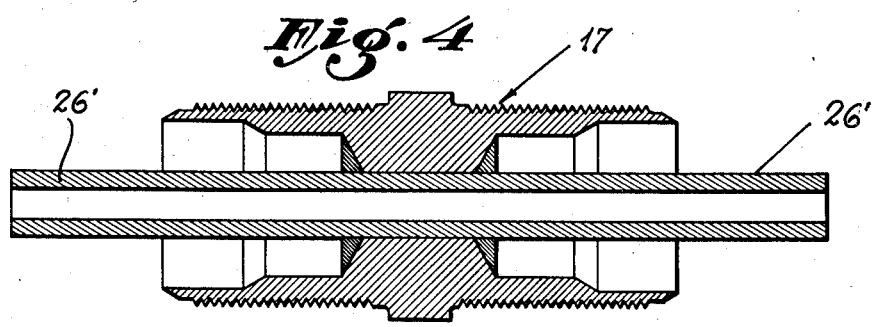
Inventor:
WALTER F. SANTHOFF,
By James N. Abbett
Attorney.

Patented Aug. 31, 1943

2,328,298

UNITED STATES PATENT OFFICE 2,328,298

DETACHABLE COUPLING FOR HIGH PRESSURE HOSE

Walter F. Santhoff, Cypress, Calif., assignor to Martin-Decker Corporation, Long Beach, Calif., a corporation of Delaware Application September 10, 1941, Serial No. 410,281

1 Claim. (Cl. 285—86)

This invention relates to conduit connections and particularly pertains to a detachable coupling for high pressure hose.

At the present time fluids are conveyed through conduits, which conduits are especially constructed to withstand relatively high internal pressure. These structures for the most part are made with an inner lining of rubber or the like, an intermediate lamination of metal giving high tensile strength to the walls of the structure, and an outer flexible layer of rubber or the like. In the use of hose of this character it is necessary to provide mechanical coupling elements so that the ends of the hose may be attached to suitable equipment. Various couplings have been made for use when the hose has been under a nominal pressure. At the present time various pieces of equipment, and particularly military equipment, have been made requiring conduits for fluids under high pressure, such for example as of the order of 18,000 pounds per square inch. The usual couplings have not been found adequate to hold such pressure, and it is the principal object of the present invention to provide a simple hose coupling for high pressure fluids which may be easily assembled and applied to the hose, and will hold the hose without possibility of rupturing it or permitting it to become loosened within the fitting irrespective of the internal pressure of the fluid.

The present invention contemplates the provision of a coupling body having a central tubular body over which a hose telescopes and a clamping sleeve fitting within the coupling body and over the hose on the mandrel, and a ferrule threaded onto the coupling body and forcing the sleeve into a clamping position.

The invention is illustrated by way of example in the accompanying drawing in which:

Figure 1 is an enlarged view in longitudinal central section showing one form of the present invention.

Fig. 2 is a view in longitudinal section showing the ferrule construction.

Fig. 3 is a view in side elevation showing the clamping sleeve.

Fig. 4 is a view in central section showing an adaptation of the present invention to form a union.

Referring more particularly to the drawing, 10 indicates an end length of a high pressure hose. This hose is shown as having a laminated wall. An inner wall section 11 is tubular and is formed with a central flow passageway 12 through which fluid may pass. Circumscribing this wall is a sheathing wall 13 formed of material which will reinforce the wall 11 and add tensile strength to it which would resist internal pressure tending to burst it. Formed on the outside of the sheathing 13 is an outer wall 14. This wall is preferably made of the same general type of material as the inner wall 11. Both may be rubber of a composition tending to resist the action of materials present in the environment in which the hose is to be used. As shown in Fig. 1 of the drawing, the end of the hose section is prepared so that a length of the outer wall 14 is removed and the sheathing wall is outermost. This end section is generally indicated at 15 in Fig. 1. Mounted at the end of the portion 15 of the hose 10 is a coupling 16, as shown in Fig. 1. In Fig. 4 of the drawing an adaptation of this structure provides a union 17, each end of which is substantially a duplicate of the coupling 16. The coupling structure 16 is formed with a relatively large section 18 of polygonal shape to facilitate in holding the coupling. A tubular extension of large diameter is formed on one side of the portion 18 as indicated at 19, and a tubular extension of smaller diameter is formed on the opposite side of the portion 18, as indicated at 20. The extension 20 is externally threaded, preferably with pipe threads, so that it may be connected to a desired piece of equipment. The relatively large tubular end 19 of the coupling is externally threaded and is formed with a central bore 21, the outer end of which is counterbored, as indicated at 22. A tapered shoulder 23 is formed at the base of the counterbore and a tapered shoulder 24 is formed at the base of the bore 21. A relatively small cylindrical bore 25 is formed within the fitting as a continuation of the bore 21 and receives a metal tube 26. The tube 26 is forced into position so as to have a press fit within the bore 25, after which the tube is further held in position by solder, which fills the tapered portion 24 as indicated at 27. The tubular member 26 is formed with a central passageway through it which is in alignment with a passageway 28 formed through the coupling 16. The outside diameter of the tube 26 agrees substantially with the inside diameter of the passageway 12 in the hose 10. The outside diameter of the reduced length 15 of the hose 10 agrees with the inside diameter of the bore 21. Thus, the inner end of the section 15 of the hose 10 will fit within the bore 21 and abut against the solder face. Disposed over the reduced portion 15 of the hose and seating against the tapered shoulder 23 of the counterbore 22 is a sleeve 29.

This sleeve, as shown in Fig. 3, has a central cylindrical portion 30 and opposite tapered end faces 31 and 32. A cylindrical extension 33 may be formed as a continuation of the end face 32 and is of an outside diameter to fit within the bore 21. The inside diameter of the sleeve and the extension 33 agree with the outside diameter of the length 15 of the hose 10. The length of the central cylindrical portion 30 of the sleeve 29 is such as to dispose the tapered face 31 beyond the end of the tubular extension 19 when the tapered face 32 of the sleeve 29 is seated against the face 23. Positioned over the threaded end 19 of the coupling is a sleeve 34, particularly shown in Fig. 2. The sleeve has a threaded tubular extension 35 into which the member 19 is screwed. A reduced central portion 36 of the sleeve 34 provides tapered faces 37 and 38 within the sleeve. The tapered face 38 engages the tapered end 31 of the sleeve 29; thus, when the sleeve 34 is screwed onto the extension 19 the face 38 will force the sleeve 29 into the counterbore 22, and due to the taper at the opposite end of the sleeve 29 will tend to force the sleeve inwardly and around the portion 15 of the hose 10 to tightly embrace the hose and form a seal-tight joint between it and the wall of the counterbore 22. It is preferable that the sleeve 29 shall be made of ductile metal, such for example as bronze, since this would tend to be deformed under pressure and to form a tight seal. The reduced portion 36 of the threaded sleeve 34 has a cylindrical center length between the inclined faces 37 and 38 which agrees substantially with the outside diameter of the length 15 of the hose, and thus makes a tight fit therewith. Extending beyond the inclined face 37 of the threaded sleeve is a cylindrical skirt 39, which is of substantially the diameter of the outside of the main body of the hose 10 and fits therearound.

In the form of the invention shown in Fig. 4 of the drawing the coupling body 17 is made with duplicate ends, and a tubular member 26' is provided which extends entirely through the coupling body so that lengths of hose may be connected on opposite sides of the coupling and the device will provide a union for two pieces of hose.

In operation of the present invention the structure is assembled with the tube 26 or 26' pressed into position and soldered. The end of the hose 10 is prepared as shown in Fig. 1 of the drawing so that a reduced portion 15 is forced into the cylindrical bore 21 of the coupling and with the sleeve 29 in position to fit into the bore 22 and abut against the tapered shoulder 23. It is also to be understood that at this time the threaded sleeve 34 has been positioned upon the end of the hose, so that when it is screwed onto the member 19 of the coupling the face 38 will be forced against the tapered end face 31 of the sleeve 29 and the sleeve 29 will be forced inwardly so that the protruding cylindrical part 33 will enter the bore 22 and around the extension 15 of the hose 10. When the threaded sleeve 34 has been tightened to its extreme position it will be seen that the length of hose 15 will be pressed between the rigid wall of the tube 26 and the sleeve 29. Attention is directed to the fact that under these conditions the wall of the hose will be gripped between two metal members without any action to abrade the wall of the hose. Various devices have been heretofore provided for gripping a hose of the character here described but these have involved the use of a threaded member or a serrated member which would be imbedded into the inner surface of the wall of the hose or into the outer surface of the wall of the hose, with a result that the wall of the hose tended to rupture and would then cause the hose to materially weaken. With the type of hose as here shown couplings have been tested under pressures up to 24,500 pounds per square inch.

It will thus be seen that the coupling structure here disclosed provides simple and effective means whereby a fitting may be attached to the end of a hose or removed therefrom, and which fitting embodies means for positively embracing and gripping the wall of a hose and reinforcing the same without marring or weakening the structure.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

A detachable coupling for high pressure hose, said hose having a plurality of laminae in its wall, at least the outer one of which is removed for a distance at the end thereof, a coupling body formed at one end with a threaded portion to make a pipe connection and at its opposite end with an exteriorly threaded tubular portion having an inner central bore and an outer counterbore with an intermediate annular tapered face and into which tubular portion the end of the hose of reduced diameter extends, a central tubular mandrel fixed within the coupling body and extending longitudinally of the tubular extension thereof and therebeyond, said mandrel fitting tightly within the hose, a deformable packing sleeve fitted upon the reduced end portion of the hose, said sleeve having a cylindrical extension adapted to fit between the hose and the inner bore of the coupling body and a cylindrical portion of larger diameter adapted to fit within the outer bore of the coupling body and to extend therebeyond, said sleeve having an intermediate tapered face abutting against the tapered face within the threaded tubular extension, and a threaded sleeve, one end of which engages the threads of the tubular extension and the other end of which is formed with a counterbore to embrace the outside diameter of the hose, said sleeve having an intermediate portion fitting around the reduced diameter of the hose and a tapered face abutting against the outer tapered face of the packing sleeve, whereby the hose will be confined within the threaded sleeve and will force the packing sleeve into a tightened position around the portion of the hose within the tubular mandrel, the inner bore of the coupling body terminating in a tapered end face around the tubular mandrel, and a tapered packing washer fitting against said face and against which the end of the hose rests.

WALTER F. SANTHOFF.